(12) United States Patent
Strobel et al.

(10) Patent No.: US 10,742,263 B2
(45) Date of Patent: Aug. 11, 2020

(54) COMMUNICATION PRECODING DEVICES AND METHODS

(71) Applicant: Lantiq Beteiligungs-GmbH & Co. KG, Neubiberg (DE)

(72) Inventors: Rainer Strobel, Munich (DE); Vladimir Oksman, Morganville, NJ (US)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 0 days.

(21) Appl. No.: 16/060,140

(22) PCT Filed: Jan. 8, 2016

(86) PCT No.: PCT/EP2016/050259
§ 371 (c)(1),
(2) Date: Jun. 7, 2018

(87) PCT Pub. No.: WO2017/118487
PCT Pub. Date: Jul. 13, 2017

(65) Prior Publication Data
US 2018/0358999 A1    Dec. 13, 2018

(51) Int. Cl.
*H04B 3/32* (2006.01)
*H04B 7/0456* (2017.01)
*H04M 11/06* (2006.01)
*H04B 7/0417* (2017.01)

(52) U.S. Cl.
CPC .............. *H04B 3/32* (2013.01); *H04B 7/0417* (2013.01); *H04B 7/0456* (2013.01); *H04M 11/062* (2013.01)

(58) Field of Classification Search
CPC ..... H04B 3/32; H04M 11/062; H04M 7/0456; H04M 7/0417
See application file for complete search history.

(56) References Cited

U.S. PATENT DOCUMENTS

| | | | |
|---|---|---|---|
| 2011/0195678 A1* | 8/2011 | Luo .................... | H04B 7/0617 455/114.3 |
| 2014/0204841 A1* | 7/2014 | Ruiz Delgado ...... | H04B 7/0689 370/328 |
| 2014/0362938 A1* | 12/2014 | Krishnamurthy .... | H04B 7/0456 375/267 |
| 2015/0244418 A1* | 8/2015 | Verbin .................... | H04B 3/32 370/201 |
| 2015/0256221 A1 | 9/2015 | Rao et al. | |
| 2015/0381233 A1 | 12/2015 | Goodson et al. | |
| 2017/0279490 A1* | 9/2017 | Maes ..................... | H04B 3/32 |

OTHER PUBLICATIONS

International Search Report dated Sep. 26, 2016 for International Application PCT/EP2016/050259.
Mohseni, Mehdi et al. "Signal Processing for G.fast+." 2015 IEEE. Asilomar 2015. pp. 1734-1738.

* cited by examiner

*Primary Examiner* — Walli Z Butt
(74) *Attorney, Agent, or Firm* — 2SPL Patent Attorneys PartG mbB

(57) ABSTRACT

Communication devices and methods are provided which enable communication both with modulo receivers and legacy receivers. Different types of precodings are used in a joint precoding to reduce crosstalk between communication connections to all receivers.

16 Claims, 4 Drawing Sheets

COMMUNICATION PRECODING DEVICES AND METHODS

This application is a National Phase entry application of International Patent Application No. PCT/EP2016/050259 filed Jan. 8, 2016, entitled "Communication Devices and Methods" in the name of Rainer Strobel et al. and is hereby incorporated by reference in its entirety.

FIELD

The present application relates to communication devices and methods, for example wire-based communication devices and methods.

Nowadays, internet access is provided to many households via conventional telephone lines, e.g. copper lines. The data rates available via such copper lines have continuously increased over the years. Initially, modems using essentially a voice bandwidth of the telephone lines provided comparatively low data rates. With the development of digital subscriber line (DSL) techniques, data rates were significantly increased by using frequency ranges above a frequency range used for voice communication. With VDSL (Very High Bit Rate DSL) and VDSL2 systems using vectoring as defined in ITU-T recommendation G.993.5, data rates up to 100 Mbit/s became available. Vectoring is a technique to cancel or reduce crosstalk between adjacent lines by joint processing at a transmitter or a receiver (typically on a provider side), which allows higher data rates.

However, for some applications even higher data rates up to 1.0 Gbit/s are desirable.

To achieve such data rates via copper lines, the copper lines need to be short, only up to 50 to 100 meters. Operation using such short loops requires installation of many small street multiple dwelling units (MDU) cabinets called distribution points (DPs) which are installed close to the customers and serve a comparatively small number of customers compared to previous DSL installations, for example 16 or 24 customers. Such distribution points are then connected to a backbone network via fiber optics. This approach is also referred to as "fiber to the distribution point" (FTTdp).

Furthermore, to achieve such high data rates over copper wires, the used frequency spectrum is increased up to 100 MHz or even 200 MHz. Such high data rates are for example specified in the G.fast standard (described e.g. in ITU-T Recommendations G.9700 and G.9701). Crosstalk between wire pairs of different subscribers becomes even more substantial at such high frequencies, such that crosstalk cancellation techniques need to be used. Most distribution points using frequencies up to 100 MHz FTTdp use linear precoding techniques similar to the vectoring used in VDSL systems. In such linear precoding techniques, essentially data units to be transmitted via a plurality of different subscriber lines are multiplied with a matrix having non-diagonal elements, such that over the lines essentially "mixtures" of data units intended for different lines are transmitted. This "mixture" is performed such that it is cancelled out by the crosstalk, crosstalk also leading to such a "mixing", such that in an ideal case the originally intended data units are received. Precoding is usually used in the downstream direction from distribution point to a subscriber, while in the upstream direction a similar technique, often referred to as cancellation or equalization, is used, where the received data units are multiplied by a matrix compensating the previously experienced crosstalk.

For higher frequencies, for example in FTTdp systems using frequencies up to 200 MHz, due to the increased crosstalk linear precoding may not be sufficient for compensating the crosstalk. In such systems, non-linear precoding, for example Tomlinson Harashima precoding, is used to suppress crosstalk.

Non-linear precoding distribution points require a different equipment on customer premises (CPE, customer premises equipment) side. In particular, for example for Tomlison Harashima precoding a so-called modulo receiver is needed, which performs a modulo operation on received signals or signals derived therefrom.

However, often the situation occurs that different CPE receivers need to be served by single distribution point. For example, some customers may have newer equipment already provided with a modulo receiver above, while other customers may still have legacy equipment without the modulo receiver. Therefore, it would be desirable to provide distribution points able to serve both kinds of receivers.

SUMMARY

In an embodiment, a communication device is provided, comprising:

a transmitter device to be coupled to a plurality of communication connections and to transmit data over the plurality of communication connections, the transmitter device comprising a precoder, the precoder being adapted to jointly precode data to be transmitted via the plurality of communication connections, wherein the precoder is adapted to perform a first type of precoding for a first set of communication connections and a second type of precoding different from the first type for a second set of communication connections different from the first set of communication connections.

"Jointly precode" in this respect in some embodiments may indicate that crosstalk between all communication connections of the first set and the second set may be reduced.

The above summary is only intended to give an overview over some aspects of some embodiments and is not to be construed as limiting. Other embodiments may comprise other features than the ones described above.

DETAILED DESCRIPTION

Figure 1:
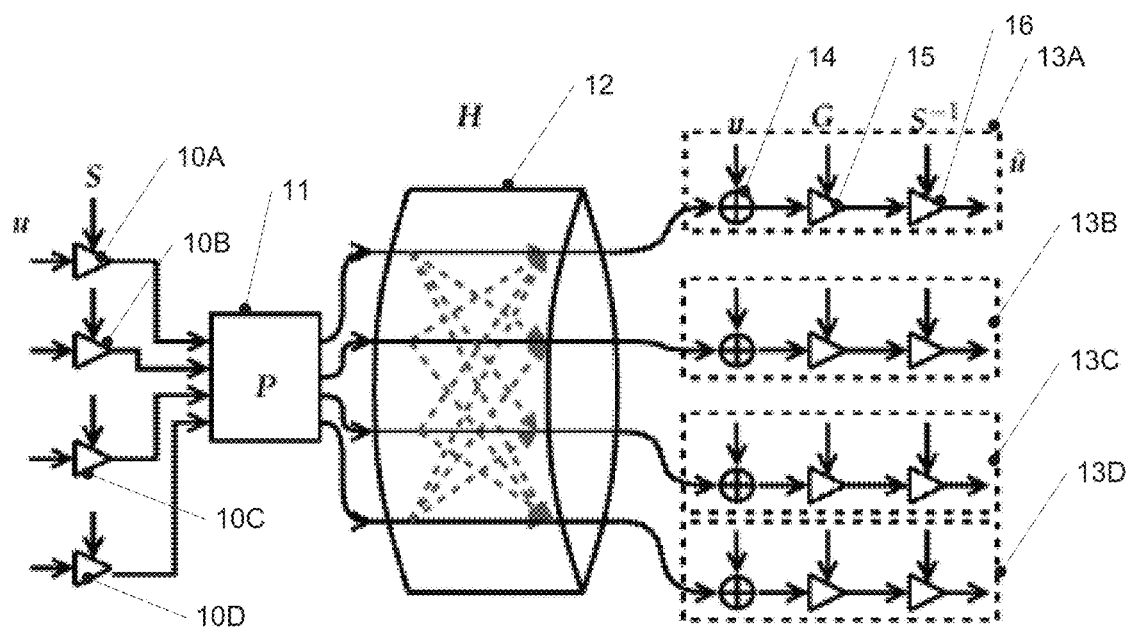
FIG. 1 is a diagram showing a system using a linear precoder.

In the following, various embodiments will be described in detail referring to the attached drawings. These embodiments are to be taken as illustrative examples only and are not to be construed as limiting. For example, while an embodiment may be described as comprising a plurality of features or elements, this is not to be construed as indicating that all these features or elements are necessary for implementation of embodiments. Instead, other embodiments may comprise alternative features and/or less features than the ones explicitly described and shown in the drawings. Moreover, additional elements or features apart from the ones explicitly described and shown may be provided.

For example, some embodiments relate to digital subscriber line (DSL) systems. Such embodiments may comprise additional features commonly employed in DSL systems, for example features defined by the various DSL standards. DSL in this context may refer to any DSL "flavor" like ADSL, VDSL, VDSL2 or G.fast.

However, while embodiments will be described in the context of DSL systems, e.g. G.fast systems, techniques described herein may also be applied to other kinds of communication, for example wireless communication.

Modifications and variations described with respect to one of the embodiments may also be applicable to other embodiments. Features from different embodiments may be combined to form further embodiments.

References like left, right, top, bottom etc. when referring to the figures serve merely for easy referral to certain elements of the figures and are not to be construed as indicating any actual spatial relationship of the elements in implementations.

The term "communication connection" is used herein to refer to both wireless connections and wire-based connections. While for illustration purposes mainly wire-based connections will be used, techniques disclosed herein may also be applied to wireless connections.

In some embodiments, precoders are employed, e.g. at a provider side, which may be accommodate both modulo receivers, for example at a customer premises equipment (CPE) side, and legacy receivers not employing a modulo operation. In some embodiments, in case a legacy receiver is coupled to a line, a modulo operation at a precoder side is omitted, while still using a feedback. In other embodiments, separate precoders are employed for modulo receivers and non-modulo receivers, each precoder having an output for each line, and the outputs of the precoders being combined, e.g. added. Other techniques may also be used.

In the context of the present application, a modulo receiver designates a receiver which supports receiving non-linear precoded signals, for example signals precoded by Tomlinson Harashima precoding. Such modulo receivers usually involve a modulo operation in a receive path. A legacy receiver is a receiver which does not support receiving non-linearly precoded signals, but only linear precoded signals, and typically does not include a modulo operation. A modulo operation is an operation comprising a division by N, wherein N may be an integer number, and outputting the rest of the division, as commonly understood in the art. The term modulo line as used herein refers to a line, for example a twisted copper line pair, connected to a modulo receiver, while the term legacy line refers to a line, for example twisted copper pair, coupled to a legacy receiver.

Turning now to the figures, for illustration and comparison purposes, FIG. 1 illustrates a conventional system using linear precoding. Therefore, FIG. 1 illustrates an example where only legacy receivers and legacy lines are present. The system of FIG. 1 may for example be a G.fast distribution point system with frequencies up to e.g. 100 MHz or a VDSL system. The example system of FIG. 1 comprises four lines, for example twisted copper lines, from a distribution point or other provider equipment (on the left side of FIG. 1) to customer premises equipment (CPE) receivers 13A to 13D, collectively referred to as CPE receivers 13.

On the transmitter side, a symbol vector u comprising a symbol for each line is scaled according to a diagonal scaling matrix S, symbolized by amplifiers 10A, 10B, 10C and 10D. The scaling by scaling matrix S determines relative transmit powers and/or a power spectral density (PSD) for the symbols intended for the various lines. In a precoder 11, the resulting vectors S×u is multiplied by a precoder matrix P having non-diagonal elements to precompensate crosstalk. Determination of the precoder matrix P may be performed according to any conventional techniques, for example by transmitting known training signal sequences and measuring an error between received symbols and transmitted symbols.

The lines (four in the example of FIG. 1) may run in a cable binder 12, where they are close to each other and therefore prone to crosstalk, as indicated by dashed arrows. The crosstalk and other effects on the transmission lines like alternation may be represented by a channel matrix H. In an ideal case, crosstalk represented by the channel matrix H is cancelled out completely by the precompensation corresponding to matrix P. In a non-ideal case, some amount of crosstalk may remain. In addition, when transmitting additive noise may be added. In each receiver 13, additive receiver noise n is added as symbolized by an adder 14. It is to be noted that no explicit adder is provided, but this is merely a representation of additive noise. Furthermore, the received signals are equalized in an equalizer 15 e.g. according to an equalizer matrix G. Additionally, a gain adjustment 16 compensates the spectrum shaping applied by matrix S at the transmitter side, for example by multiplication with a matrix $S^{-1}$, i.e. the inverse of S. This forms a received signal for each receiver 13, which may be represented as a vector û, each component of û corresponding to a received signal of one receiver.

The number of four lines serves only as an example, and any number of lines may be provided. For example, distribution points may typically serve 16 subscribers corresponding to 16 lines or 24 subscribers corresponding to 24 lines. However, application of the techniques disclosed herein is not limited to any particular number of lines.

Figure 2:
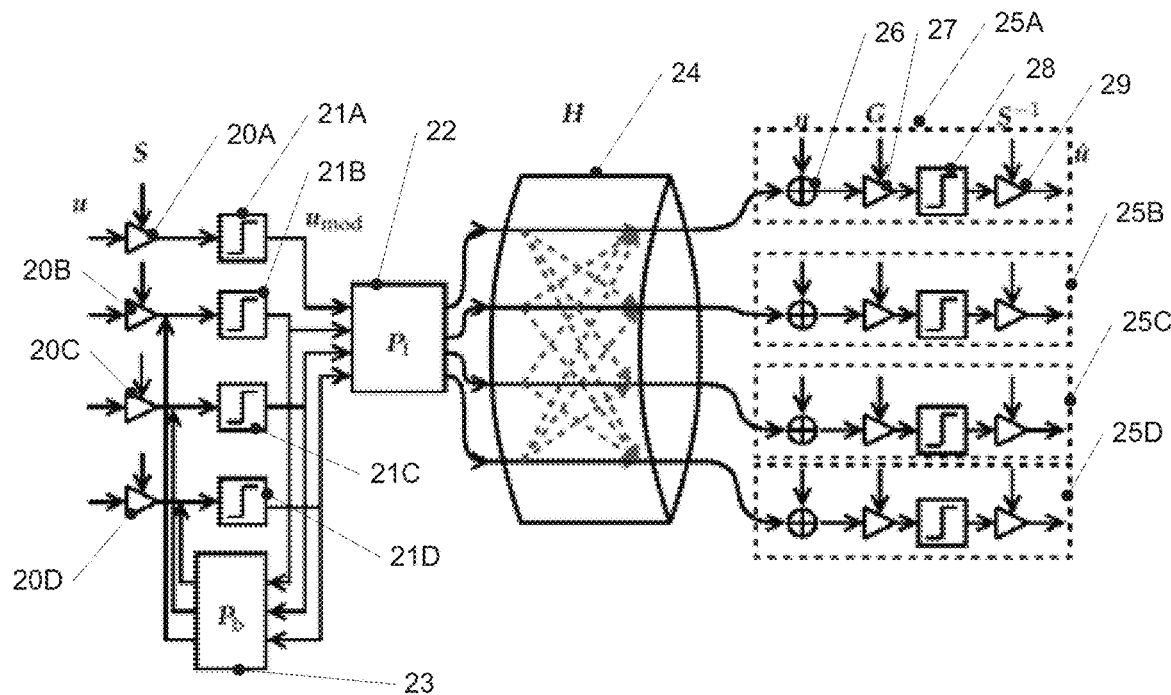
FIG. 2 is a diagram illustrating a system using a Tomlinson Harashima precoder.

FIG. 2 shows a further comparative example using a Tomlinson Harashima precoder. Such a system may for example be employed for in higher frequency G.fast systems, for example in systems using frequencies up to 200 MHz. Again, on the left side a provider equipment, for example a distribution point, is illustrated, and on the right side in FIG. 2 four modulo receivers 25A to 25D are illustrated, which are coupled to the provider side by respective lines. While four lines are used as an example, this is again not to be construed as limiting, and the concepts and techniques disclosed herein may be applied to any number of lines.

In FIG. 2, similar to FIG. 1 a vector u is scaled by a scaling matrix S as represented by amplifiers 20A to 20D.

In some cases, to control the transmit spectrum, the scaling matrix S may be equal to $s_0 \times I$, I being a matrix having elements of 1 in the diagonal and 0 otherwise. The result is subjected to a modulo operation 21A to 21D, respectively. Outputs of the modulo operation are fed back to the inputs for the second, third and fourth channel via a feedback matrix $P_b$, and all outputs of modulo operations 21A to 21D are provided to a feedforward precoder with a matrix $P_f$. This kind of Tomlinson Harashima precoding is per se a conventional approach and will not be described in detail. Coefficients of matrixes $P_f$ and $P_b$ may be obtained in any conventional manner, for example using training signals.

Output symbols are transmitted via lines which may be provided in an cable binder 24, and are therefore prone to crosstalk, which may be represented in a channel matrix H.

The modulo receivers 25A to 25D each comprise an equalization 27 according to an equalization matrix G, followed by a modulo operation 28 and an inverse scaling 29 to compensate the power shaping on the provider side, for example corresponding to a matrix $S^{-1}$. In addition, additive receiver noise n may be added as symbolized by adders 26.

At the output of modulo receivers 25, output symbols which may be written as an output vector û are provided. Coupling a legacy receiver (for example as shown in FIG. 1) to the lines of FIG. 2, i.e. a receiver without modulo operation, would at least severely deteriorate data rates and other operations, if not make data transmission at least on the respective line impossible.

It is to be noted that the various components and operations shown at the provider side and receiver side in FIGS. 1 and 2 (for example amplifiers 20, modulo operation 21 etc.) need not be implemented as discrete elements. Instead, the operations may for example be performed in a specifically designed and programmed processor like a digital signal processor (DSP) performing the operations on digital data. In addition, apart from the elements explicitly shown, other conventional elements in subscriber line systems, for example line drivers, amplifiers, fourier transformations (for example Fast Fourier Transformation, FFT) and the corresponding inverse fourier transformations may be provided.

Moreover, FIGS. 1 and 2 show operation in downstream direction, i.e. from a provider side to CPE receivers. Corresponding techniques may also be employed in upstream direction, where instead of a precompensation, i.e. a compensation prior to transmitting the data, a cancellation, i.e. a joint processing after receiving the data, may be performed. For example, in the upstream direction a linear cancellation similar to FIG. 1 may be used, or a nonlinear cancellation referred to as Decision Feedback Equalization which works similar to Tomlinson Harashima precoding may be used.

As explained above, the system of FIG. 1 operates well when only legacy receivers 13 are present, and the system of FIG. 2 operates well when only modulo receivers 25 are present. However, in practical cases it may be required that both legacy receivers and modulo receivers are served by a same distribution point. Embodiments disclosed herein provide precoders usable on a provider side, for example in distribution points, which are able to serve both legacy receivers and modulo receivers with good performance.

Figure 3:
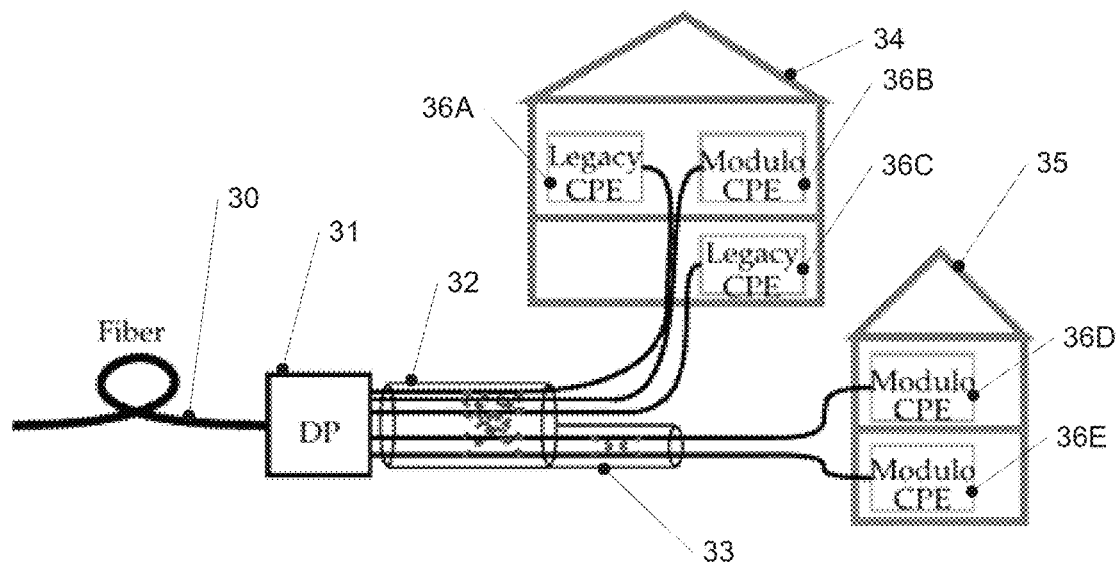
FIG. 3 is a diagram illustrating a deployment scenario for embodiments.

To illustrate this, FIG. 3 shows an example for a deployment scenario where embodiments may be used. In FIG. 3, a distribution point 31 is coupled to a backbone network via a fiber (e.g. glass fiber) 30. Distribution point 31 in the illustrative example of FIG. 3 serves two houses 34, 35. In house 34, three CPE receivers 36A to 36C are coupled with distribution point 31 via respective lines, and in house 34 to CPE receivers 36D, 36E are provided and coupled to distribution point 31 via respective lines. The lines may for example be twisted pair copper lines.

In the example of FIG. 3, all lines run in a common cable binder 32, leading to crosstalk between all the lines. Furthermore, the lines to house 35 continue to run in a common cable binder 33, leading to additional crosstalk between these lines. Other scenarios are also possible.

In the example of FIG. 3, CPE receivers 36A, 36C are legacy receivers, while receivers 36B, 36D and 36E are modulo receivers. Using techniques disclosed herein and described in the following in more detail, distribution point 31 may serve all CPE receivers 36A to 36E while maintaining a high level of crosstalk precompensation. In some embodiments, for the modulo receivers efficient use of higher frequencies may be provided.

Figure 4:
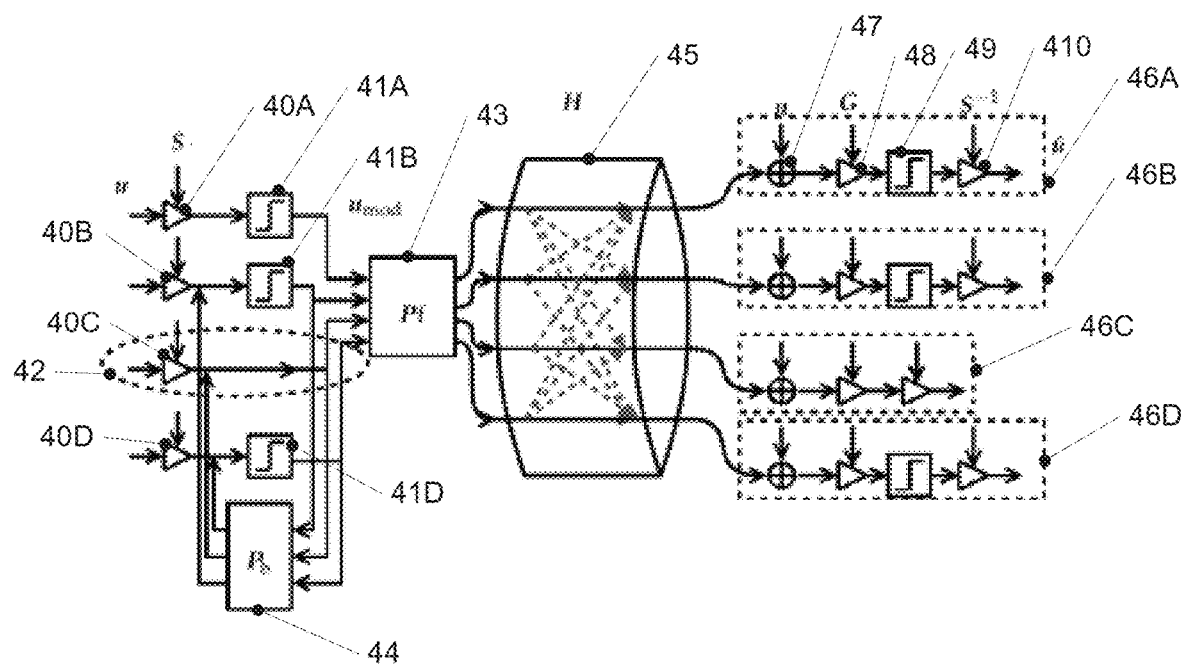
FIG. 4 is a diagram illustrating a system according to an embodiment.

FIG. 4 illustrates a system according to an embodiment. When describing the system of FIG. 4, some references will be made to the systems already described with respect to FIGS. 1 and 2 in order to avoid repetition and also in order to clarify the differences between the system of FIG. 4 and the systems of FIGS. 1 and 2. The system of FIG. 4 is adapted to serve a mixture of legacy receivers and modulo receivers. In the illustrative example of FIG. 4, for example three modulo receivers 46A, 46B and 46D and one legacy receiver 46C are served by a distribution point. Again, the number of four receivers and also the partitioning into three modulo receivers and one legacy receiver is only an illustrative example, and more receivers and corresponding more lines and/or a different partitioning between modulo receivers and legacy receivers may be provided in other examples.

Modulo receivers 46A, 46B and 46D may be designed as explained for modulo receivers 35A to D of FIG. 2 and are depicted as comprising an adder 47 adding additive noise n (which, as explained above, is not a discretely implemented adder, but simply symbolizes noise added at the receiver), an equalizer 48 which may be written as matrix multiplication with an equalizer matrix G, a modulo operation 49 and a gain adjustment 410 compensating the gain adjustment by matrix S on a transmitter side, for example symbolized by multiplication with the inverse matrix $S^{-1}$.

Legacy receiver 46 may be designed as discussed for legacy receivers 13A to 13D of FIG. 1. For example, as illustrated in FIG. 4, legacy receiver 46 comprises elements 47, 48 and 410 which are also present in modulo receivers 46A, 46B and 46D, but does not comprise a modulo operation 49.

On the distribution point side, data units to be transmitted, which may be written as a vector u, are scaled according to a scaling matrix S for shaping power spectral density. Approaches for optimizing power spectral density shaping in the embodiment of FIG. 4 will be discussed further below. The scaling is symbolized by amplifiers 40A to 40D. An output of these amplifiers is subjected to a modulo operation for the lines coupled to a modulo receiver, as shown by modulo operations 41A, 41B, 41D. For the legacy line, where the processing is generally denoted 42, no modulo operation is provided.

For every line but the first (topmost in FIG. 4), a feedback 44 is provided described by a feedback matrix $P_b$. In other words, the processing 42 for the legacy line is also involved in the feedback. Furthermore, the output of modulo operators 41A, 41B and 41D for the symbols to be sent to modulo receivers and the output of amplifier 40C for the symbol to be sent to legacy receiver 46C are fed to a precompensator 43, the operation of which may be described by a forward precompensation matrix $P_f$. Matrixes $P_b$, $P_f$ may be determined essentially as in conventional cases by an optimization involving the sending of training sequences and minimizing error values.

The outputs of precompensator 43 are then transmitted via respective communication lines, which may be arranged at least for some distance in a cable binder 45 (for example like cable binders 32, 33 of FIG. 3), where they experience crosstalk as indicated by dashed arrows. This crosstalk is precompensated at least to some extent by precompensator 43 and feedback 44.

As no modulo operation 41 is provided at processing 42, performance of the legacy receiver 46C does at least not significantly deteriorate compared to a pure linear precoding as in FIG. 1. On the other hand, as feedback is provided and modulo operations are provided for symbols to be sent to modulo receiver 46A, 46B, 46D, data rates to these receivers may essentially benefit similar to a full non-linear precoding, for example Tomlinson Harashima precoding, similar to the case of FIG. 2.

As discussed previously for FIGS. 1 and 2, elements 40, 41, 43 and 44 need not be implemented as discrete elements, but may for example be implemented by a specifically provided and programmed processor like a digital signal processor or by specific hardware acting on digital values. In such a digital scenario using for example a digital signal processor, assignment of lines to modulo receivers and legacy receivers may be flexible, and the modulo operation, which is a simple mathematical operation, may be selectively provided where needed. In this way, for example in embodiments a single distribution point architecture may be used for various configurations and mixtures of legacy receivers and modulo receivers.

Figure 5:
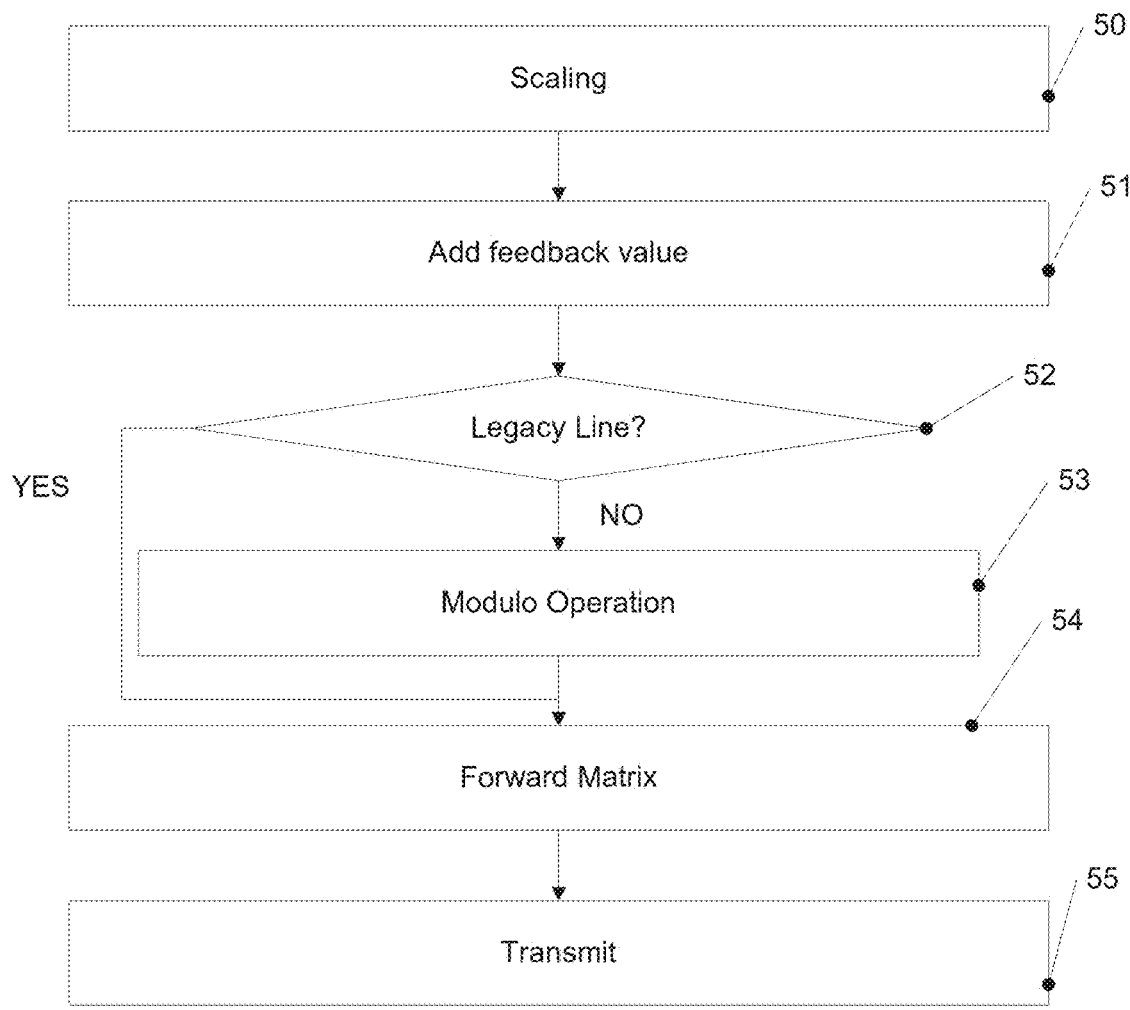
FIG. 5 is a flowchart illustrating a method according to an embodiment.

To illustrate this further, FIG. 5 is a flow chart illustrating a method according to an embodiment, which may for example be implemented in the provider side of FIG. 4. For illustration purposes, the method of FIG. 5 will be explained referring to FIG. 4. However, application of the method of FIG. 5 is not limited to the system and devices shown in FIG. 4.

At 50 in FIG. 5, a scaling of symbols or other data values to be transmitted via a plurality of lines is performed. For example, the scaling may be performed to optimize a power spectral density (PSD) and may be performed by multiplication with a scaling matrix S, as explained with reference to FIG. 4.

At 51, a feedback value is added, for example for all lines except a first, as explained with reference to FIG. 4 (via feedback 44). For example, output values may be multiplied with a feedback matrix $P_b$ to provide feedback values as explained above.

At 52, a check is performed whether a line is a legacy line. For non-legacy lines, i.e. lines coupled to modulo receivers, at 53 the method comprises performing a modulo operation (for example modulo operations 41A, 41B, 41D). In case a legacy line is concerned, the modulo operation is omitted (for example at 42 in FIG. 4).

The results are on the one hand fed back as output values for the feedback at 51, and on the other hand at 53 are provided to a precompensator (for example 43 of FIG. 4). The precompensator may involve a multiplication with a forward precompensation matrix $P_f$. Through the feedback, the overall precoding is non-linear (the precoding in the precompensation at 53 per se may be linear). At 54, the thus formed symbol values are transmitted, for example by using conventional transmission techniques involving for example Fourier transforms, amplifiers, symbol mappings or other techniques conventionally employed in the art, in particular in the art of digital subscriber lines.

It should be noted that to some extent a legacy line with no modulo operation (for example a line to legacy receiver 46C of FIG. 4) may cause a power increase for all other lines of the group of lines subjected to precoding (also referred to as vectored group), in particular if a used transmit power spectral density is higher than one determined by the modulo operation for other lines. In embodiments, to compensate the power increase in other lines, a transmit spectrum shaping may be used. In other words, for example the matrix S is optimized such that constraints for power spectral density may be fulfilled.

Figure 6:
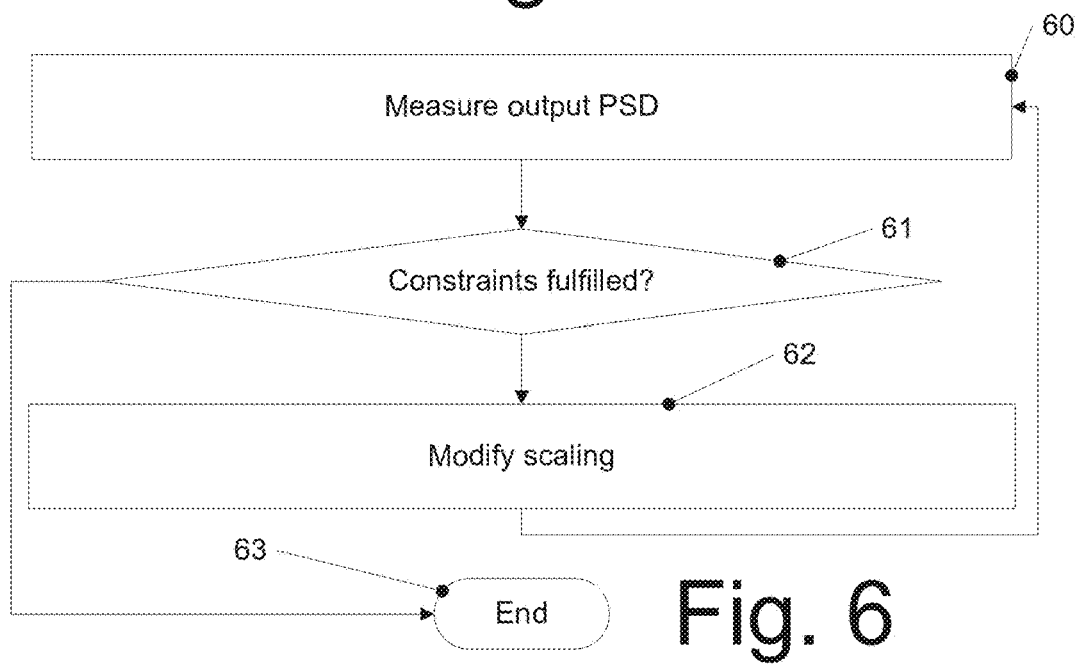
FIG. 6 is a flowchart illustrating a method according to an embodiment.

An embodiment of a method usable for transmit power scaling is schematically shown in FIG. 6. After discussing the method of FIG. 6 in general, which shows a rather schematic and general approach, details of an embodiment for transmit power scaling will be described in more detail.

At 60 in FIG. 6, an output power spectral density is measured or determined, for example based on an output of precoder 43 of FIG. 4. At 61, it is evaluated if the output power spectral density fulfills desired constraints. If this is not the case, at 62 the scaling (for example matrix S) is modified, and the method continues at 60, until at 61 all constraints are fulfilled, in which case the method ends at 63. Therefore, FIG. 6 essentially describes an iterative process to adjust the scaling. Non-iterative processes may also be used.

Next, embodiments implementing such a transmit power measurement and spectral shaping will be explained in more detail. For the following explanations, it is assumed that the transmit power spectral density and power at the output of a provider equipment like a distribution point has to satisfy transmit power limitations. For example, for DSL applications, there are generally two constraints. On the one hand, there is a per-line wideband power limitation to a power limit $p_{sum}$ (i.e. the overall transmit power on a line is limited to $p_{sum}$). Furthermore, there is a spectral mask constraints, which gives a frequency dependent power limit $p_{mask}^{(k)}$ for a subcarrier k which is at a frequency $f_k=k\Delta f$ with a subcarrier spacing $\Delta f$, which is a PSD constraint. Generally, in DSL techniques data is transmitted over a plurality of subcarriers, also referred to as tones, as specified in the corresponding DSL standards.

A spectral mask constraint with respect to a transmit covariance matrix $C_{tx}^{(k)}$ is given by:

$$\mathrm{diag}(C_{tx}^{(k)}) \le p_{mask}^{(k)} \qquad (1)$$

and the per-line sum-power constraint is given by:

$$\sum_{k=1}^{K} \mathrm{diag}(C_{tx}^{(k)}) \le p_{sum}. \qquad (2)$$

For linear precoding with a precoding matrix P as e.g. shown in FIG. 1, the power increase due to the precoding operation can be calculated directly from the precoder matrix, as it is a linear operation. The transmit covariance matrix $C_{tx}$ for linear precoding is given by:

$$C_{tx}^{(k)} = P^{(k)} S^{(k)} S^{H,(k)} P^{H,(k)}. \qquad (3)$$

H denotes the adjunct matrix, i.e. $S^H$ is the adjunct matrix of S, and $P^H$ is the adjunct matrix of P.

The transmit gains S are selected such that the constraints are satisfied.

For Tomlinson Harashima precoding, the power increase is depends on the constellations used. With a constellation size b, the power increase within the modulo operation is given by:

$$[P_m^{(k)}]_H = \begin{cases} \dfrac{4}{3} & \text{for } b_l^{(k)} = 1 \\ \dfrac{16}{14} & \text{for } b_l^{(k)} = 3 \\ \dfrac{M_l^{(k)}}{M_l^{(k)} - 1} & \text{for } b_l^{(k)} \text{ even} \\ \dfrac{9 M_l^{(k)}}{8(31/32)(M_l^{(k)} - 1)} & \text{for } b_l^{(k)} \text{ odd}, b_l^{(k)} > 3 \end{cases} \quad (4)$$

where $M_l^{(k)} = 2^{b_l(k)}$.

None of the above-mentioned calculations (for both linear and TH precoding) is suitable for the proposed mixed scheme of the embodiment of FIG. 4 or similar approaches because of the nonlinear operation in lines using modulo operation and the feedback used in the transmitter. Therefore, according to an embodiment an effective gain matrix $P_m$ is estimated using the linear approximation given by:

$$P_{m,lin}^{(k)} = X^{(k)} U_s^{t,(k)} \quad (5)$$

where t is the pseudoinverse and $X^{(k)}$ is a matrix of signal vectors $x^{(k),[t]}$, $X = [x^{(k),[1]}, \ldots, x^{(k),[t]}, \ldots, x^{(k),[T]}]$ and $U_s^{(k)} \ldots [Su(k), 1], \ldots, Su^{(k),|t}, \ldots, Su^{(k),[t]}]$. In another embodiment a quadratic approximation may be used based on the transmit covariance matrices at the input of the nonlinear operation:

$$C_{in}^{(k)} = E[S^{(k)} u^{(k)} u^{H,(k)} S^{H,(k)}] \quad (6)$$

and the covariance matrix at the output of the nonlinear operation is $$C_{out}^{(out)} = E[u_{mod\ out}^{(k)} u_{mod\ out}^{H,(k)}]. \quad (7)$$

and the $$P_{m,quad}^{(k)} = \text{diag}\left(\left[\sqrt{\dfrac{[C_{out}^{(k)}]_{11}}{[C_{in}^{(k)}]_{11}}}, \ldots, \sqrt{\dfrac{[C_{out}^{(k)}]_{LL}}{[C_{in}^{(k)}]_{LL}}}\right]\right) \quad (8)$$

The effective gain matrix $P_m^{(k)}$ is then given by a digonal part built from two block matrices by taking the rows of $P_{m,lin}^{(k)}$ for lines without modulo operation in the transmitter and rows of $P_{m,quad}^{(k)}$ for the lines with modulo operation in the transmitter (and receiver) to form the overall matrix $P_m^{(k)}$ that is used to calculate the transmit spectrum of FIG. 4. The estimated transmit covariance matrix as as a function of S is given by $$C_{tx} = P_l^{(k)} P_m^{(k)} S^{(k)} S^{H,(k)} p_m^{H,(k)} p^{H,(k)} \quad (10)$$

which is then used for transmit spectrum optimization. These calculations correspond to examples for the measuring at 60 of FIG. 6, either using the linear approximation of equation (5). Based on the covariance matrix $C_{tx}$, the transmit spectrum may be optimized, corresponding to 62 of FIG. 6.

What will be described next is a method according to an embodiment to find the scaling matrix $S^{(k)}$. The description of the optimization method that follows is done with respect to the input transmit power vector $x^{(k)}$, because a simpler mathematical description is possible for the power vector. The actual scaling matrix may then be derived by $S^{(k)} = \text{diag}(\sqrt{x^{(k)}})$. The described optimization in an embodiment may be done by giving priority for Tomlinson-Harashima TH lines with no modulo operation (linear precoding). This will obviously slightly reduce the performance of lines using linear precoding giving advantage to TH lines, but overall performance loss is usually insignificant.

The transmit power limitations to be satisfied for DSL systems as explained above are a per-line sum-power constraint and a spectral mask constraint. A third constraint reflects the limited capabilities of the modulator, which does not allow constellation sizes larger than $2^{b_{max}}$. This can be represented by an equivalent power limit $p_{max,i}^{(k)}$. It is given by $$x_l^{(k)} \le p_{bmax,l}^{(k)} = \dfrac{(2^{b_{max}} - 1)\sigma^2 \Gamma}{|h_l^{(k),T} p_l^{(k)}|^2}. \quad (11)$$

The proposed approach according to some embodiments may also be applied to other power constraints or general constraints that may be translated into power constraints.

The present embodiment can be applied to linear precoding, nonlinear precoding and to a mixed scheme, e.g. as shown in FIG. 4. The nonlinear operation gain is approximated by the matrix $p_m^{(k)}$ wick is set to identity for a linear precoding system. The constraint set is as $$A^{(k)} - \begin{pmatrix} \tilde{A}^{(k)} \\ I_L \\ I_L \end{pmatrix} d^{(k)} - \begin{pmatrix} p_{mask}^{(k)} \\ p_{bmax}^{(k)} \\ 0_L \end{pmatrix}. \quad (12)$$

For linear precoding $\tilde{A}^{(k)} = P^{(k)} \odot P^{(k),s}$ where $\odot$ is the Hadamard product is used. For nonlinear precoding as well as for the mixed scheme, $$\tilde{A}^{(k)} = (P_f^{(k)} P_m^{(k)}) \odot (P_f^{(k)} P_m^{(k)})^* \quad (13)$$

is used.

The rate can be calculated with respect to the receive equalizer which gives $$R_{TH,l}^{(k)} = \sum_k^K \log_2\left(1 + x_l^{(k)} (\Gamma \sigma^2 |g_l^{(k)}|^2)^{-1}\right). \quad (14)$$

The objective according to equation (1) is concave in and the constraint set is linear. Therefore, the spectrum optimization problem for linear and nonlinear precoding, which reads as $$\max_{x^{(1)},\ldots,x^{(K)}} \sum_{l=1}^L R_l \; \forall k: A^{(k)} x^{(k)} \le d^{(k)} \; \forall k = 1, \ldots, K \quad (15)$$

$$\sum_{k=1}^K \tilde{A}^{(k)} x^{(k)} \le p_{sum},$$

is a convex problem. The optimization problem of Eq. (15) is coupled over all lines and all subcarriers which makes it difficult to solve the optimization problem directly for the typical system size of G.fast FTTdp. As in an embodiment, Lagrange duality is used to separate the problem into a per-carrier subproblem and a sum-power allocation problem. Starting with the Lagrange function $\Phi(x, \mu_{sum})$ $$\Phi(x, \mu_{sum}) = \sum_{l=1}^{L} -R_l + \mu_{sum}^T \left( \sum_{k=1}^{K} \tilde{A}^{(k)} x^{(k)} - p_{sum} \right), \quad (16)$$

the per-carrier problem as stated in Eq. (16) is convex in x and it is twice differentiable. The first derivative is given by $$\frac{\partial \Phi(x, \mu_{sum})}{\partial x_l} = -\frac{1}{x_l + \Gamma |g_l|^2 \sigma^2} + \tilde{A}^{(k),T} \mu_{sum}, \quad (17)$$

and the second derivative is obtained as $$\frac{\partial^2 \Phi(x, \mu_{sum})}{\partial x_v \partial x_d} = \begin{cases} -\frac{1}{(\Gamma |g_v|^2 \sigma_v^2)^2} & \text{for } v = d \\ 0 & \text{for } \overline{v} \neq d \end{cases}. \quad (18)$$

Therefore, Newtons method can be used to solve the per-carrier problem. The vector $\nabla \Phi$ of first derivatives and the matrix $\nabla^2 \Phi$ of second derivatives can be used to approximate the objective function.

In each step, the problem $$\min_{x^{(k)}} f_q(x, x_0), \text{ s.t. } A^{(k)} x^{(k)} \leq d^{(k)} \quad (19)$$

is solved, where the objective function is given by $$\Phi(x,\mu_{sum}) \approx f_q(x,x_0) = \Phi(x_0,\mu_{sum}) + c_q^T x + x^T H_q x \quad (20)$$

with $c_q = \nabla \Phi + \nabla^2 \Phi x_0$ and $H_q = \frac{1}{2} \nabla^2 \Phi$. The solution of Eq. (1) is used as a starting point for the next iteration. A small number of quadratic approximation steps is required to come very close to the optimal solution for the per-carrier problem.

The sum-power allocation problem is solved using a projected gradient approach. The gradient step for $\mu_{sum}$ is $$\mu_{sum\_grad}^{[t]} = \mu_{sum}^{[t]} + \alpha_p \left( \sum_{k=1}^{K} \tilde{A}^{(k)} x^{(k)} - p_{sum} \right) \quad (21)$$

followed by the projection step $$\mu_{sum,l}^{[t+1]} = \max(\mu_{sum,grad,l}^{[t]}, 0). \quad (22)$$

The above method is summarized in the pseudocode below, which implements a linear or nonlinear zero-forcing precoder.

```
Initialize μ_sum=0_L
repeat
    for k = 1 to K do
        Start with all lines active
        repeat
            Calculate ZF precoder (3.22)
            Initialize x^(k)
            Calculate constraint set (3.11)
            repeat
                Calculate quadratic approximation (3.18) using (3.15)
                    and (3.16) and solve (3.17)
            until Convergence of x^(k)
            Update selected active channels, H_active^(k)
        until All active carriers meet SNR lower bound
    end for
    Update power allocation using (3.19) and (3.20)
until Per-line sum-power is converged
```

$$\hat{b}_l^{(k)} = \min(\lfloor b_l^{(k)} \rfloor, b_{max}). \quad (23)$$

Eq. (23) indicates that there is not only an upper bound on the bit loading, but also a lower bound, because tones where the SNR is insufficient to load one bit, will transmit zero bits. To use this knowledge, the row vectors $h_{active,l}^{(k)}$ corresponding to the lines of carrier k transporting at least one bit are collected in a reduced channel matrix $H_{active}^{(k)} \in \mathbb{C}^{L_{active} \times L}$ with $L_{active}$ active lines. Performing the pseudo-inverse $(.)^+$ on the reduced channel matrix $$P_{active}^{(k)} = H_{active}^{(k),+} \quad (24)$$

gives the precoder matrix $P_{active}^{(k)} \in \mathbb{C}^{L \times L_{active}}$. For TH precoding, QR decomposition of $H_{active}^{(k)}$ may be performed. In this way, the power spectrum may be optimized in embodiments.

Figure 7:
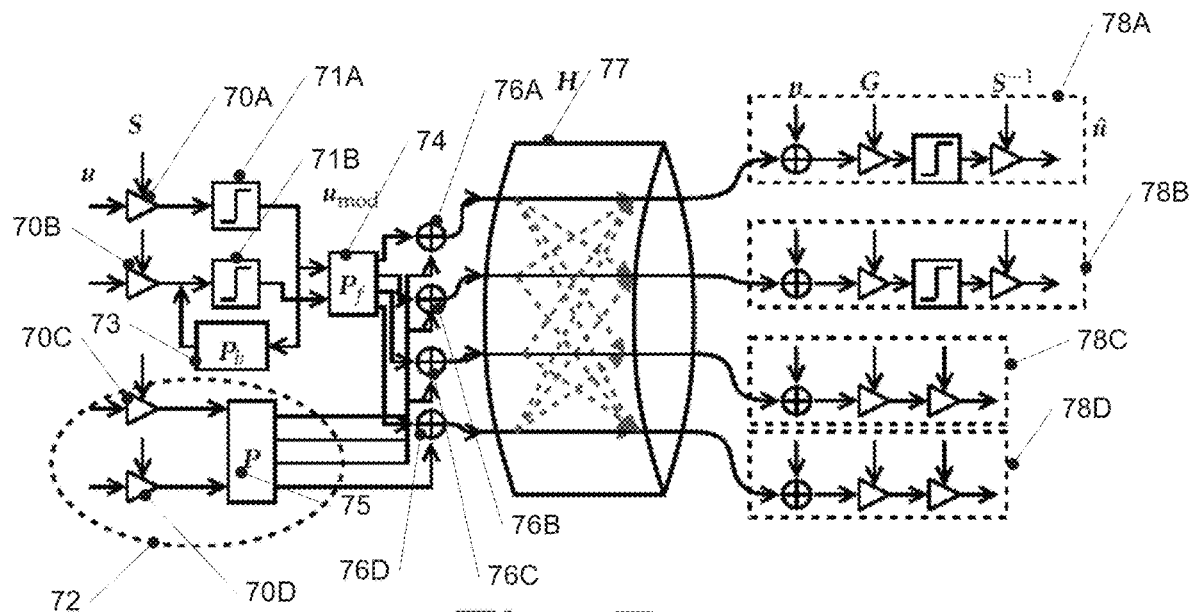
FIG. 7 is a diagram illustrating a system according to an embodiment.

The arrangement of FIG. 4 is merely as an example, and other arrangement for a "mixed" precoding taking account of both modulo receivers and legacy receivers are also possible. To such variations, also the method explained above for transmit a PSD optimization may be applied. To give an example, FIG. 7 illustrates a further embodiment of a system and device usable in a distribution point which allows to serve both legacy CPE receivers and modulo CPE receivers. In the example of FIG. 7, two modulo receivers 78A, 78B and two legacy receivers 78C, 78D are provided. The modulo receivers and legacy receivers may be implemented as discussed with respect to FIGS. 1 (legacy receivers) and 2 (modulo receivers), respectively and are coupled to a provider equipment like a distribution point (shown on the left side of FIG. 7) via respective lines, which may run in a cable binder 77 and are therefore prone to crosstalk.

Furthermore, in FIG. 7, on the left side a provider equipment, for example provided in a distribution point, is shown. Essentially, for the modulo lines connected to receivers 78A, 78B, Tomlinson Harashima precoding similar to FIG. 2 is provided, and for the legacy lines connected to receivers 78C, 78D linear precoding is provided. However, to be able to pre-compensate crosstalk between all the lines, some differences exist to merely providing separate linear and non-linear precoding, as will be explained below in more detail.

For all lines, the symbols are subjected to scaling, as indicated by amplifiers 70A to 70D, which may be represented by multiplying a symbol vector u by a scaling matrix S. For the legacy lines, this is followed by a linear precoder using a precoding matrix P. The linear part of the precoding for the legacy lines is generally labeled with reference numeral 72 in FIG. 7.

For the modulo lines, a modulo operator 71A, 71B follows the scaling. Feedback is provided for one of the lines (e.g. all lines but one in case of more than two modulo lines) via a feedback 73 based on a feedback matrix $P_b$. Furthermore, the output of modulo operation 71A, 71B $u_{nod}$ are provided to a precoder 74 based on a forward precoding matrix $P_f$.

In contrast to conventional linear or non-linear precoding schemes as illustrated in FIGS. 1 and 2, precoders 74, 75 each have four outputs, one for each overall line, while having only two inputs (one for each modulo line or one for each legacy line, respectively). Therefore, in the example case of FIG. 7, matrixes $P_f$, P may be 4×2 matrixes instead of quadratic matrixes in the conventional case. The output of precoders 74, 75 are summed as indicated by adders 76A to 76D. Again, the operations performed on the left side of FIG. 7 need not be implemented using discrete elements, but may be implemented using for example a corresponding digital signal processor specifically programmed to perform the corresponding calculations. The coefficients of the matrix P in an embodiment are selected such that the crosstalk between all lines is cancelled, for example $$P_{full}^{(k)} = H^{(k),-1} \text{diag}(\text{diag}(H^{(k),-1}))^{-1} \qquad (25)$$

wherein $P_{full}$ is the matrix for all lines and H is the full channel matrix for all lines, but for forming matrix P only the corresponding columns for legacy lines are used. In this way, crosstalk from the modulo lines (non-linear precoding lines) into the legacy lines is cancelled.

In a similar manner, the non-linear precoding coefficients for matrixes $P_f$ and $P_b$ are derived from the full channel matrix H (which may be determined as mentioned above by using test sequences and measuring error values), but also only the columns corresponding to the modulo lines are used. Furthermore, in some embodiments an encoding order for precoding the lines is arranged such that first the legacy lines are encoded, while the lines with modulo CPE receivers are encoded last. In this way, there is no or essentially no crosstalk from the non-linear precoded lines into the legacy lines in some embodiments.

Estimation of a transmit power gain $P_m^{(k)}$ for the non-linear precoding lines in the embodiment of FIG. 7 may be performed as described in equation (4) above. The overall linear gain matrix for this scheme in an embodiment consists of the columns of the matrix $P_f^{(k)}$ for non-linear precoding lines and the columns of the matrix P for linear precoding lines (legacy lines). Based on this, the transmit spectrum optimization as explained above may be performed.

In the embodiments above, signals to be transmitted over lines are uniformly precoded. For example, to modulo receivers Tomlinson-Harashima precoding may be used, and for legacy receivers an essentially linear precoding or at least a precoding without modulo operation is used.

In other embodiments, different kinds of precoding may be used for transmitting data to a single receiver, for example different portions of the spectrum. For example, for a first set of subcarriers (tones), for example subcarriers below a predetermined frequency threshold, linear precoding may be used, while for a second set of tones, for example for subcarrier frequencies above a predetermined threshold, non-linear precoding like Tomlinson Harashima precoding may be used. The threshold may for example be around 100 MHz, for example at 106 MHz. In such a case, for subcarriers to which a different precoding is applied for different lines (e.g. linear precoding for some lines and Tomlinson Harashima precoding for other lines) may use the techniques described above, while for other subcarriers linear precoding may be used uniformly across all lines.

In embodiments where Trellis coding is additionally used, this Trellis coding may also be split. One Trellis sequence may be used for the set of subcarriers using only linear precoding, and another sequence may be used for the set of subcarriers where at least some lines use non-linear precoding. The CPE receiver in such embodiments need to be constructed accordingly. For example, in such an embodiment modulo receivers may use a modulo operation only for the second set of subcarriers, while legacy receivers may never use a modulo operation.

In other embodiments, three sets of subcarriers may be used. A first set of subcarriers, for example below a threshold, may use linear precoding across all lines. A second set of subcarriers, for example above the first threshold and below a second threshold, may use non-linear precoding for modulo lines and linear precoding for legacy lines. A third set of subcarriers, for example above the second threshold, is not used for transmission to legacy CPE receivers and is only used with non-linear precoding to modulo receivers. In this case, the techniques discussed above may be applied in particular to the second set of subcarriers, while for the first set of subcarriers linear precoding may be used for all lines, and for the third set of subcarriers only non-linear precoding may be used for the modulo lines, while no power is transmitted via the legacy lines.

Other partitionings of tones or subcarriers may also be used. In other words, the techniques discussed above need not be applied over the complete spectrum, but in some embodiments may also be applied only to parts of the spectrum.

In other embodiments, time interleaved precoding may be employed. With time interleaved precoding, different symbols in a frame (also referred to as time division duplexing (TDD) frame in this context) or in different TDD frames in a super frame may be treated differently as regards precoding. In such an embodiment, for example legacy CPE receivers and modulo CPE receivers may use different parts of the TDD frame or super frame. Such an approach may reduce data rates for the legacy lines, as the legacy receivers receive data only during part of the TDD frames. However, modulo receivers may receive both linear precoded symbols and non-linear precoded symbols and therefore in such an embodiment only have a comparatively small data rate reduction compared to a case where Tomlinson-Harashima precoding is employed all the time. In such an embodiment, operation of the provider equipment, for example distribution point changes between the configuration of FIG. 1 and the configuration of FIG. 2, wherein in the configuration of FIG. 2, the legacy lines present are excluded from precoding and are not assigned any transmit power. For example, if one receiver of the four receivers shown in FIGS. 1 and 2 were a legacy receiver (for example 13D, 25D) and the remaining receivers were modulo receivers, during a part of a TDD frame or super frame where linear precoding is used, all receivers would be served with data, while during non-linear precoding (FIG. 2) receiver 25D would be excluded from being served with data.

The subcarrier sets used for linear and non-linear precoding may be exchanged or negotiated in early stages of an initialization process.

Figure 8:
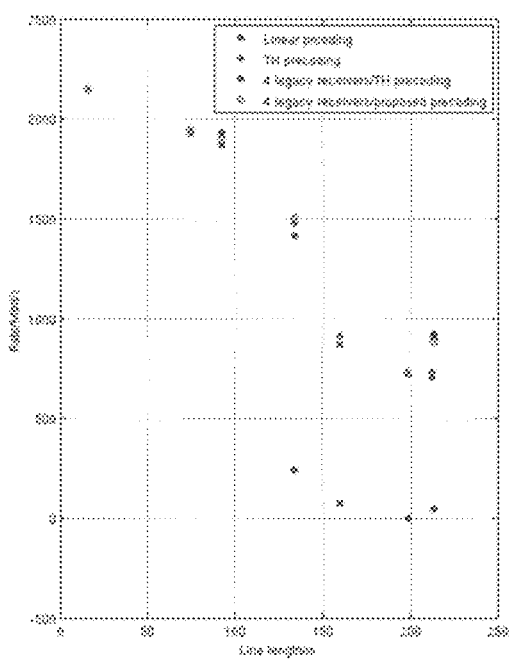
FIG. 8 illustrates simulation results for an embodiment and comparative examples.

To illustrate the effects of some embodiments, FIG. 8 shows simulation results for a system employing a mixed precoding as illustrated for example in FIG. 4. FIG. 8 shows data rates for a scenario where all lines are linearly precoded and data rates for a scenario where all lines are Tomlinson Harashima precoded. Furthermore, FIG. 8 shows the data rate for various line lengths. The examples used for simulation were for a case where eight receivers with different line lengths were employed.

Furthermore, the simulation shows the result for a case where out of eight lines total, four were connected to legacy receivers, but nevertheless, Tomlinson Harashima precoding was used for all lines. As can be seen, for higher line lengths the data rates on the legacy lines drop significantly. Finally, a case is shown where again four receivers were legacy receivers, but the mixed precoding of FIG. 4 was used. In this case, essentially the data rates for linear precoding or Tomlinson Harashima precoding may be obtained, i.e. all lines are served with at least almost the data rate which would be achievable in a pure linear system for legacy receivers and pure Tomlinson Harashima system for modulo receivers.

It should be noted that the figures and numbers shown in FIG. 8 serve only illustration purposes, and the exact data rates and other results may depend on a particular implementation and particular circumstances, for example other noise sources. Therefore, FIG. 8 serves only as an illustrative example and is not to be construed as limiting.

As can be seen from the above explanations, numerous modifications and variations are possible without departing from the scope of the present application. Therefore, the embodiments discussed above are not to be construed as limiting in any way.

The invention claimed is:

1. A communication device, comprising:
a transmitter device coupled to a plurality of communication connections and configured to transmit data over the plurality of communication connections, the transmitter device comprising a precoder, the precoder being adapted to jointly precode data to be transmitted via the plurality of communication connections, wherein the precoder is adapted to perform a first type of precoding for a first set of communication connections comprising receivers of a first type and a second type of precoding for a second set of communication connections comprising receivers of a second type, wherein the receivers of the second type are different from the receivers of the first type, and wherein the first type of precoding is different from the second type of precoding,
wherein the communication device is adapted for multicarrier communication, wherein the precoder is adapted to perform the first and second types of precoding for a first set of subcarriers of the multicarrier communication, and to perform a same type of precoding for all communication connections at least for a second set of subcarriers, and
wherein the first set of subcarriers consists of subcarriers having a frequency above a frequency threshold, and the second set of subcarriers comprises a set of subcarriers consisting of subcarriers below the frequency threshold.

2. The device of claim 1, wherein the first set of subcarriers consists of subcarriers having a frequency below a further threshold, the further threshold being higher than the threshold, wherein for a third set of subcarriers consisting of subcarriers having frequencies above the further threshold, the transmitter is adapted to transmit data only on a part of the communication connections for subcarriers of the third set.

3. The device of claim 1, wherein the first type of precoding comprises a modulo operation, and the second type of precoding omits the modulo operation.

4. The device of claim 3, wherein the precoding comprises a feedback, wherein processing for at least one communication connection of the second set of communication connections is included in the feedback.

5. The device of claim 1, wherein the precoder comprises a non-linear precoder for data to be transmitted via the first set of communication connections and a separate linear precoder for the second set of communication connections, wherein the non-linear precoder and the linear precoder each have a number of outputs equal to an overall number of communication connections in the first set and the second set, wherein outputs of the non-linear precoder and the linear precoder are combined.

6. The device of claim 1, wherein the first type of precoding comprises non-linear precoding and the second type of precoding comprises linear precoding.

7. A communication device, comprising:
a transmitter device coupled to a plurality of communication connections and configured to transmit data over the plurality of communication connections, the transmitter device comprising a precoder, the precoder being adapted to jointly precode data to be transmitted via the plurality of communication connections, wherein the precoder is adapted to perform a first type of precoding for a first set of communication connections comprising receivers of a first type and a second type of precoding for a second set of communication connections comprising receivers of a second type, wherein the receivers of the second type are different from the receivers of the first type, and wherein the first type of precoding is different from the second type of precoding,
wherein the precoder is adapted to use the first type of precoding for the first set of communication connections during a first set of time slots of a time division duplexing scheme, and to use the second type of precoding during a second set of time slots different from the first set of time slots, and
wherein the transmitter is adapted to transmit to only the first set of communication connections during the first set of time slots and to transmit to all communication connections using the second type of precoding during the second set of time slots.

8. The device of claim 1, the device further comprising a power spectral density scaling at an input of the precoder, wherein the device is adapted to modify the power spectral density scaling based on a power spectral density at an output of the precoder.

9. The device of claim 8, wherein the adapting comprises estimating the power spectral density at the input of the precoder.

10. The device of claim 9, wherein the estimating comprises at least one of a linear estimation or a quadratic estimation.

11. The device of claim 9, wherein the adapting comprises adapting based on an optimization process.

12. A method, comprising:
transmitting data over a plurality of communication connections, and
jointly precoding data to be transmitted via the plurality of communication connections, wherein the jointly precoding comprises performing a first type of precoding for a first set of communication connections comprising receivers of a first type and a second type of precoding for a second set of communication connections comprising receivers of a second type, wherein the receivers of the second type are different from the receivers of the first type, and wherein the first type of precoding is different from the second type of precoding,
wherein the jointly precoding comprises a non-linear precoding for data to be transmitted via the first set of communication connections and a linear precoding for the second set of communication connections, wherein the non-linear precoding and the linear precoding each generate a number of outputs equal to an overall number of communication connections in the first set and the second set, wherein the method comprises combining the outputs of the non-linear precoder and the linear precoder.

13. The method of claim 12, wherein the transmitting of data comprises a multicarrier communication, wherein jointly precoding further comprises performing the first and second types for a first set of subcarriers of the multicarrier communication, and performing a same type of precoding for all communication connections at least for a second set of subcarriers.

14. The method of claim 13, wherein the first set of subcarriers consists of subcarriers having a frequency above a frequency threshold, and the second set of subcarriers comprises a set of subcarriers consisting of subcarriers below the frequency threshold, and wherein the first set of subcarriers consists of subcarriers having a frequency below a further threshold, the further threshold being higher than the threshold, wherein the second set of subcarriers comprises a further set of subcarriers consisting of subcarriers having frequencies above the further threshold.

15. The method of claim 12, wherein the first type of precoding comprises a modulo operation, and the second type of precoding omits the modulo operation, and wherein the second type of precoding comprises a feedback.

16. The method of claim 12, further comprising determining a receiver type of each receiver of each communication connection of the plurality of communication connections prior to transmitting the data.

\* \* \* \* \*